United States Patent [19]

McSmith

[11] Patent Number: 4,720,139
[45] Date of Patent: Jan. 19, 1988

[54] VARIABLE RESPONSE LOAD LIMITING DEVICE

[75] Inventor: Dwight D. McSmith, Hampton, Va.

[73] Assignee: The United States of America as represented by the Administrator of the National Aeronautics and Space Administration, Washington, D.C.

[21] Appl. No.: 309,291

[22] Filed: Oct. 6, 1981

[51] Int. Cl.[4] .............................................. B60R 21/00
[52] U.S. Cl. .................................... 297/216; 188/373; 248/548; 248/608
[58] Field of Search ................ 297/216; 188/373, 371; 244/1 R; 248/548, 549, 608, 570; 293/133

[56] References Cited

U.S. PATENT DOCUMENTS

| | | | |
|---|---|---|---|
| 2,227,717 | 1/1941 | Jones | 297/216 |
| 2,275,573 | 3/1942 | Sturm et al. | |
| 2,916,081 | 12/1959 | Pinkel | |
| 2,942,459 | 6/1960 | Schilling | |
| 3,081,991 | 3/1963 | Swainson | |
| 3,098,645 | 7/1963 | Owens | |
| 3,118,660 | 1/1964 | Saniewski | |
| 3,124,342 | 3/1964 | Ormond | |
| 3,198,288 | 8/1965 | Presunka | |
| 3,209,864 | 10/1965 | Boyd | |
| 3,268,256 | 2/1965 | Blank | 297/216 |
| 3,272,492 | 9/1966 | Jones | |
| 3,337,236 | 8/1967 | Peterson | |
| 3,345,106 | 10/1967 | Tschursch et al. | 248/608 |
| 3,354,990 | 11/1967 | Stahl | |
| 3,391,885 | 7/1968 | Genco | |
| 3,420,475 | 1/1969 | Castillo et al. | |
| 3,493,082 | 2/1970 | Bell | |
| 3,568,806 | 3/1971 | Butt | 188/373 |
| 3,582,133 | 6/1971 | Delavenne | |
| 3,603,638 | 9/1971 | McGregor | 297/216 |
| 3,677,371 | 7/1972 | Lutchansky | 188/373 |
| 3,718,326 | 2/1973 | Ristau | |
| 3,887,223 | 6/1975 | Bez | 293/133 |
| 3,908,951 | 9/1975 | Goben | |
| 3,953,068 | 4/1976 | Porsche et al. | 297/216 |
| 3,968,863 | 7/1976 | Reilly | 297/216 |
| 4,152,012 | 5/1979 | Reidelbach et al. | 293/133 |
| 4,349,167 | 9/1982 | Reilly | 297/216 |

FOREIGN PATENT DOCUMENTS 185403 4/1956 Austria .............................. 188/373

*Primary Examiner*—Kenneth J. Dorner
*Assistant Examiner*—Peter R. Brown
*Attorney, Agent, or Firm*—George F. Helfrich; John R. Manning; Wallace J. Nelson

[57] ABSTRACT

An energy absorbing device used as a load limiting member in a structure to control its response to applied loads is disclosed and functions by utilizing a spool assembly 20 having flanged ends 36 and an interior cavity 34 of sufficiently large diameter to cause it to deform plastically at a prescribed load. In application, the spool 20 is utilized as a pivot point for the legs 14 of an aircraft seat 12. When properly designed and integrated into the seat arrangement 10, the spool 20 will twist about its axis, deforming plastically when the impact load exceeds the spool yield value. Through this deformation, spool 20 absorbs the kinetic energy of the movement of seat 10 at a substantially constant rate, thereby controlling the level of loads transmitted to the seat occupant. By proper sizing and selection of materials, it is possible to control load response in a predictable manner.

7 Claims, 10 Drawing Figures

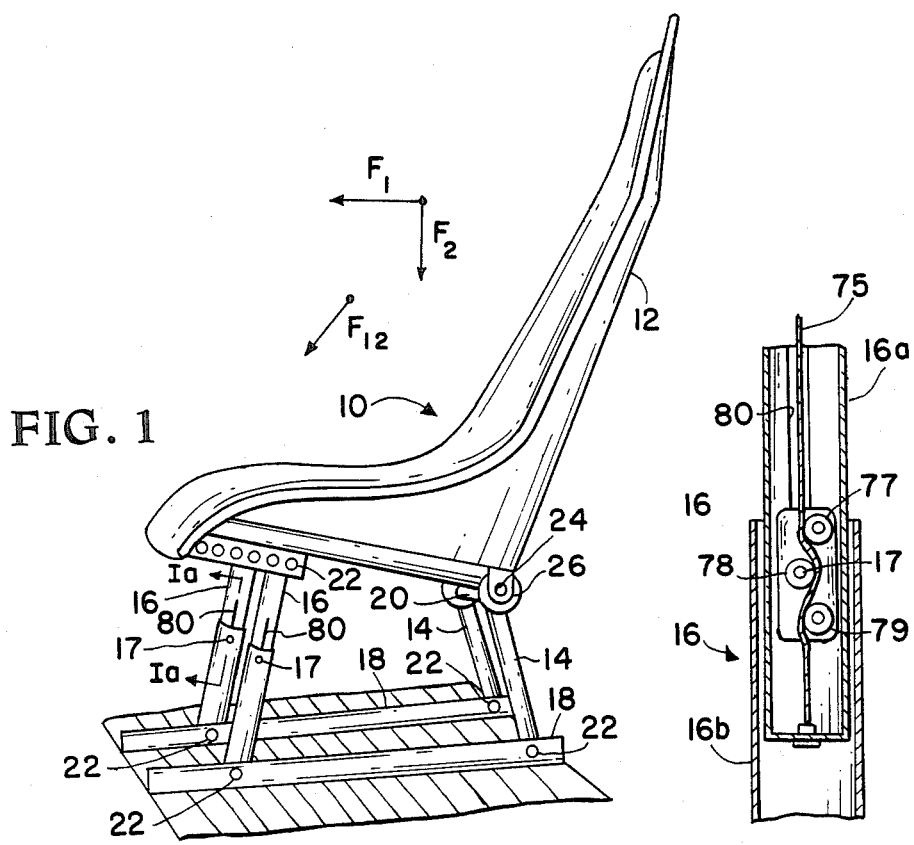
FIG. 1
FIG. 1a
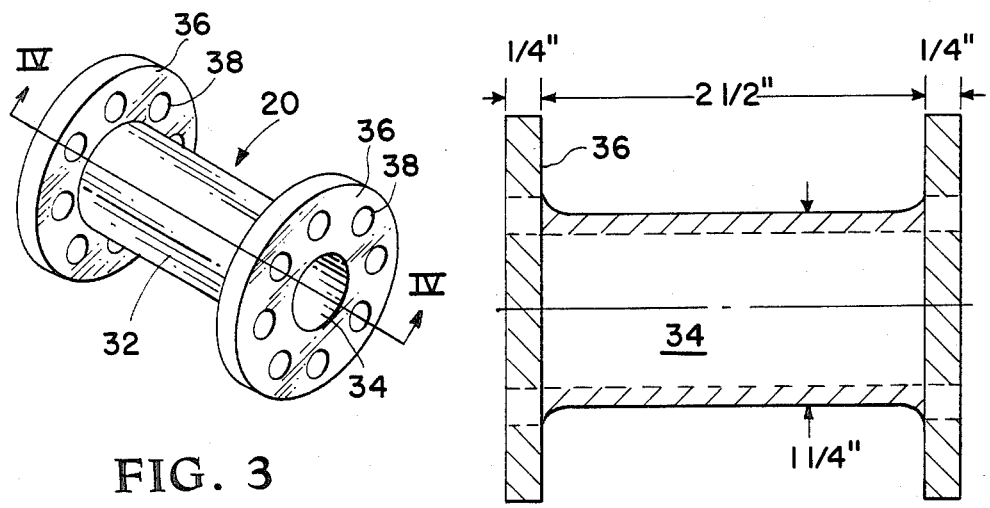
FIG. 3
FIG. 4

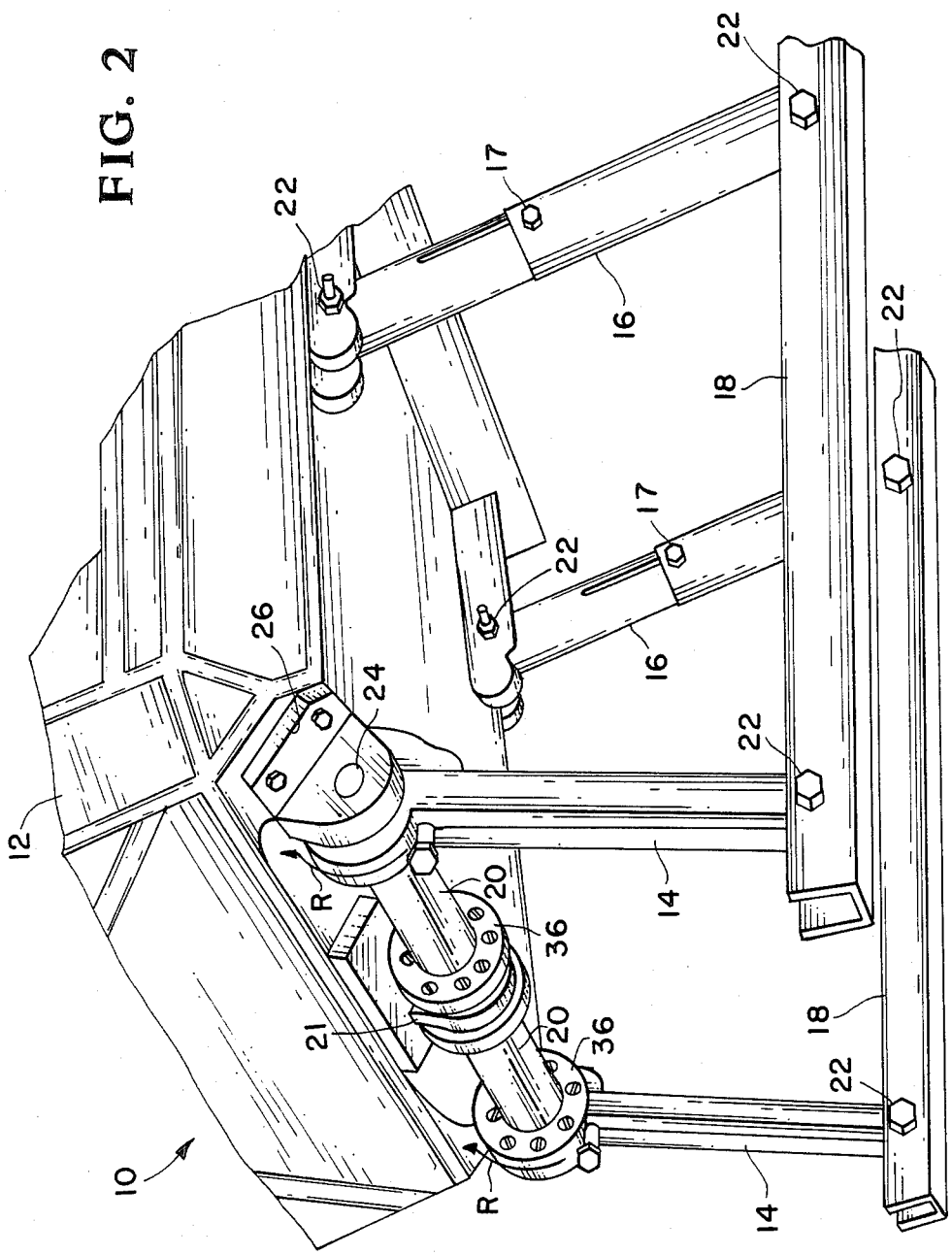

VARIABLE RESPONSE LOAD LIMITING DEVICE

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

This invention relates to a load limiting device for dissipating impact loads, and more particularly to a spool assembly which is used as a load limiting member in a structure to control its response to applied loads.

Controllable absorption of kinetic energy is desirable in many situations for reducing the impact of sudden stops, thereby keeping the level of transmitted loads within the limits of human tolerance. In a typical airplane or automobile crash, for instance, the vehicle experiences energy impulses which, if transmitted to the passenger, are capable of causing severe bodily injury or death. It has been shown that the largest number of injuries and facilities in such crashes occur when the seat fails to hold the passenger in place because of its inability to withstand the peak forces to which it is subjected. It is therefore desirable to equip these vehicles with seat structures which can absorb the energy of impact and thereby control the level of loads transmitted to the seat occupant.

In meeting this challenge, designers have developed seats which utilize load limiting devices such as wire bending apparatus, shock absorbers and inverting tubes to dissipate impact loads. Many of these devices, however, deform elastically when subjected to high impact loads, thereby resulting in recoil and subsequent human injury once the load is removed. Therefore, although the device may have successfully prevented a severe initial impact shock in one direction, it will not restrain relative motion in the opposite directions. In addition, those devices which are designed to deform plastically usually experience a high peak in the elastic region before plasticity is achieved or break upon application of severe loads. It is therefore desirable to design a device with a progressive load response, thereby protecting the seat occupant from any sudden movement which may cause injury.

Accordingly, it is an object of this invention to provide a device which is used as a load limiting member in a structure to control its response to applied loads.

Another object of the invention is to provide a device which will deform plastically at a prescribed load, thereby absorbing the kinetic energy of impact at a substantially constant rate throughout its deformation.

Yet another object of this invention is to provide a device whose response to loads can be controlled in a predictable manner.

Still another object of this invention is to provide a load limiting device which is lightweight, readily adaptable to present and anticipated vehicle construction techniques, easy to manufacture, and relatively inexpensive.

SUMMARY OF THE INVENTION

The foregoing and other objects of the invention are achieved by providing a load limiting device which comprises a spool assembly having flanged ends and an interior cavity of sufficiently large diameter to cause it to deform plastically when subjected to loads. In application, the spool may be utilized as a pivot point of the legs of an aircraft seat. When properly designed and integrated into the structure, the spool will yield at a prescribed load, absorbing the kinetic energy of impact at a substantially constant rate throughout many degrees of rotation. By proper sizing and selection of materials, it is possible to control load response in a predictable manner.

Other advantages and objects of the present invention will become apparent from the following explanation of an exemplary emodiment and accompanying drawings thereof.

BRIEF DESCRIPTION OF THE DRAWINGS

FIG. 1 is a schematic view of a load limiting vehicular seat system in which the spool assembly of the present invention is incorporated;

FIG. 1a is a sectional view of one leg of the seat system taken along line Ia—Ia of FIG. 1;

FIG. 2 is a rear view of the seat shown in FIG. 1 emphasizing the spool assembly thereon;

FIG. 3 is a plan view of the spool assembly employed in the seat arrangement shown in FIGS. 1 and 2;

FIG. 4 is a sectional view of the spool assembly of FIG. 3 taken along line IV—IV of FIG. 3;

Figure 5:
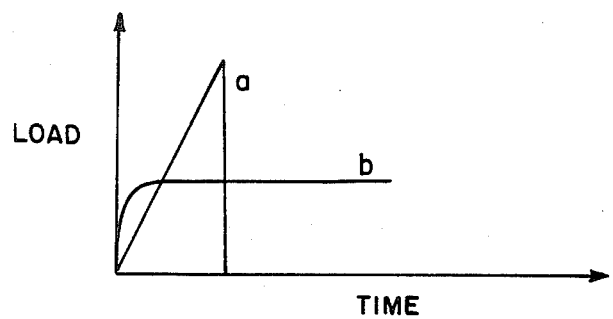
FIG. 5 is a graphical comparison of the load response of a seat arrangement with an integrated spool assembly to that of a seat arrangement without any type of load limiting member.

In describing the preferred embodiment of the invention illustrated in the drawings, specific terminology will be resorted to for the sake of clarity. However, it is not intended to be so limited to the specific terms selected, and it is to be understood that each specific term includes all technical equivalents which operate in a similar manner to accomplish a similar purpose.

DETAILED DESCRIPTION OF THE INVENTION

Referring now to FIGS. 1 and 2, there is shown a load limiting seat arrangement, designated generally by reference numeral 10, and incorporating the load limiting device or spool assembly 20 of the present invention. The seat arrangement consists primarily of a seat structure 12 having deformable front legs 16 and being attached to rear legs 14 by means of two energy absorbing spool assemblies 20.

Front legs 16 which are disposed essentially vertically on either side of seat structure 12, comprise shock absorbers which collapse upon application of relatively downward load forces. In particular, these shock absorbers utilize a strap bending device which absorbs energy through the bending of metal. Upon collapse of legs 16, a metal strap 75 (FIG. 1a) is pulled through a series of rollers 77, 78 and 79 which are placed on alternate sides of the strap, thereby causing it to bend. The work expended in bending metal strap 75 serves to dissipate the energy imparted to legs 16. In addition, legs 16 are attached to both vehicle floor 18 and seat structure 12 by pivotal connections 22, thereby allowing the entire seat arrangement 10 to move forward as well as downward when subjected to impact loads.

Metal straps or ribbon 75 is secured internally to both ends of section 16a of leg 16. Section 16a is telescopically received within section 16b upon collapse of the shock absorbing leg. Rollers 77, 78 and 79 are fixed for rotative movement about their individual axes within a trolley or housing maintained within section 16b of leg 16 by bolt axle or pin 17 extending therethrough and serving also as the rotative axle for roller 78. Strap 75 is constructed from a tapered ribbon of mild steel in the preferred embodiment with the taper thereof progressing from approximately one inch at the beginning of the shock stroke to a half-inch or less at the end of the stroke to maximize initial shock absorption and gradually diminish the metal being bent as the stroke progresses. Slot 80 is provided on opposite surfaces of section 16a to permit movement thereof past axel 17.

In contrast to front legs 16, rear legs 14 comprise rigid members angled slightly forward when incorporated into seat arrangement 10. This disposition permits both ends of rear legs 14 to pivot about their connections upon forward movement of seat structure 12. Although secured to vehicle floor 18 by pivotal connections 22, rear legs 14 are rigidly connected to spool assemblies 20 and are further supported by braces 26 extending from seat structure 12. These braces 26, however, do not inhibit pivotal movement of rear legs 14.

FIGS. 3 and 4 present two views of the energy absorbing spool assembly 20 of this invention. Used primarily to dissipate impact loads, spool assemblies 20 are disposed along a horizontal axis adjacent the width of seat structure 12 of FIGS. 1 and 2, and are rigidly attached thereon at 21. A typical spool assembly 20 comprises a tubular shaft 32 having integrally formed connecting means on either end. Spool 20 employs circular flanges 36 having a plurality of holes 38 arranged concentrically therethrough. Because this device 20 may be incorporated into many structures, the design of the connecting means is not limited to the flanges 36 disclosed, but may vary to accommmodate the particular application. In addition, it is not necessary that both ends utilize identical connections.

Spool assembly 20 features a tubular shaft 32 having an interior cavity 34 of sufficient diameter to cause shaft 32 to deform plastically at a prescribed load. The plasticity of a material is simply that property wherby the material undergoes a permanent change in shape or size when subjected to a stress exceeding a particular value, the yield value. It is this ability to undergo a permanent structural change which gives spool 20 its energy absorbing characteristics.

In the preferred embodiment of the present invention, spool assembly 20 is machined from one piece of metal stock, thereby having no welds which can fail under stress. This unitary construction provides a spool assembly 20 of maximum overall strength. Although the metal used in the disclosed spool 20 is 2024-T4 aluminum, titanium or any other metal or metal alloy which is lightweight and not prone to rupture may be used. In addition, to maintain the rotational integrity of spool assembly 20 of FIGS. 1 and 2, and to prevent transverse breakage thereof, a loose fitting rigid axle 24 runs through the interior cavity 34 of tubular shaft 32. This axle 24 also serves as a connection between rear legs 14 and their braces 26, thereby providing an axis about which rear legs 14 may rotate.

In operation, seat arrangement 10 serves to absorb the energy of impact associated with sudden stops, thereby reducing the magnitude of peak forces transmitted to the seat occupant. FIG. 5 is a graph comparing the load response of a seat without any type of load limiting member, curve a, to that of a seat 10 which incorporates an energy absorbing spool assembly 20, curve b. The high peak of curve a represents the large initial energy impulse which a vehicle experiences upon impact. Since the seat is unable to dissipate this energy plastically, it is transmitted directly to the occupant, thereby causing severe injury or death.

In contrast, curve b presents a much more tolerable load response under the same conditions. By incorporating a load limiting device 20, seat arrangement 10 can dissipate the kinetic energy of impact plastically and thereby control the level of loads transmitted to the seat occupant. Although the total amount of energy imparted to the vehicle is the same in each case, the seat of curve b protects its occupant by extending its response over a longer time period, thereby ensuring that the level of transmitted loads never exceeds the limits of human tolerance. It is therefore desirable to develop seats which utilize load limiting devices 20 to dissipate impact loads, thereby protecting the seat occupant from injury-causing energy impulses.

In a typical crash situation, seat 10 and its occupant experience a combination of longitudinal and vertical loads $F_1$ and $F_2$ (FIG. 1) which causes seat 10 to move forward and downward. Therefore, upon impact, the seat will translate in the direction of $F_{12}$, i.e., the vector of typical input loads, maintaining its posture relative to vehicle floor 18. Front legs 16 will collapse under the pressure of the downward force $F_2$ and rotate about their pivotal connections 22 in response to the forward movement of seat 10. Rear legs 14 will also pivot forward so as to keep the bottom of seat 12 relatively parallel to vehicle floor 18. By operating as pivot points for rear legs 14, spool assemblies 20 will twist about their axes in the direction of the arrow R, as shown in FIG. 2, and deform plastically when the load exceeds the yield value of spool 20, thereby absorbing the kinetic energy of seat 10 movement. Spool assemblies 20 thereby cushion the shock to the seat occupant by permitting the seat to move downwardly through a limited distance relative to vehicle floor 18.

Figure 6:
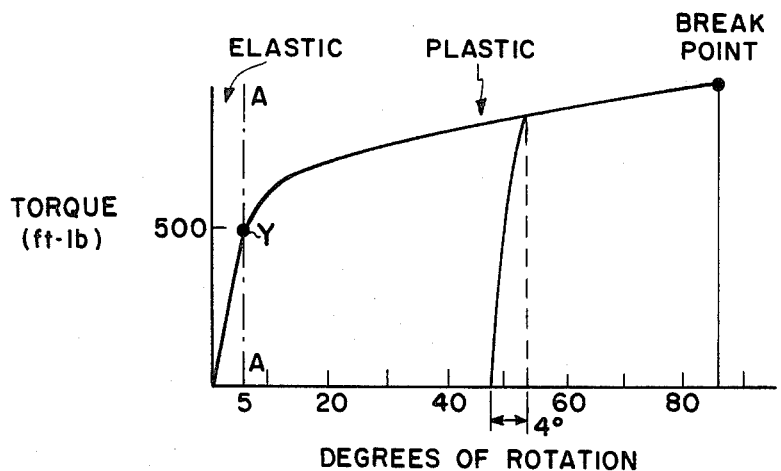
FIG. 6 is a graphical illustration of the experimentally determined load response of a spool assembly.

The spool assembly 20 of the present invention takes advantage of the principle that the energy associated with a load or force can be dissipated through the plastic deformation of a material. FIG. 6 shows the load response of a typical spool assembly 20 which has a length of approximately three inches, an inside diameter of approximately one inch and an outside diameter of approximately one and one-fourth inch. The area to the left of line A—A is generally referred to as the region of elastic load response. The elaticity of a material is simply that property whereby the material changes its shape and size when subjected to stress, but recovers its original configuration when the forces are removed. Therefore, the spool assembly 20 described will deform elastically up to an applied torque of approximately 500 ft-lbs, returning to its original shape when the load is removed. Once this load is exceeded, however, the spool 20 is said to experience its yield value, Y, whereby it exhibits plastic characteristics and undergoes permanent structural changes.

By operating primarily in the plastic region, spool assembly 20 will respond to loads in a lightly progressive manner as illustrated by the upward slope of the curve to the right of line A—A. This response will continue until spool assembly 20 has been totally utilized in absorbing energy and can accommodate no further load. At this point, called the break point, spool 20 will fail. The disclosed spool 20, for instance, experiences 85° rotation before reaching its break point. Should the load be removed while spool 20 is operating in the plastic region, however, there will be only minimal recoil. As is illustrated by the solid curved line and the dotted vertical line shown between the 40 and 60 degree of rotation stations the disclosed spool 20 experienced only about 4° rotational recoil when the load was removed.

By varying the dimensions of spool assembly 20, its load response may be altered accordingly. For instance, the elasticity of spool 20 may be altered by changing the thickness of the shaft 32 wall. Specifically, the wall thickness required to achieve a particular yield value, Y, is calculated by the following equation:

$$Y = \frac{16\ TD}{\pi(D^4 - d^4)}$$

where, y = yield value (that load at which plastic response begins)
T = torque applied to spool
D = outside diameter of shaft 32
d = inside diameter of shaft 32.

This equation indicates that a tubular shaft 32 with very thick walls, and thereby a small inside diameter, d, will respond elastically to greater levels of applied torque, T, than would a similar shaft 32 with thinner walls. Therefore, spool 20 would transmit higher levels of energy before it begins to absorb and dissipate impact loads. By utilizing a tubular shaft 32 with a large inside diameter, d, the spool's deformation under loads will be mostly within the plastic region of the load response curve. In other words, the yield value, Y, of spool 20 decreases with decreasing wall thickness.

In addition, the plastic response of spool 20 may be altered by varying the length of tubular shaft 32. The following data indicates that as the length of shaft 32 is increased, spool 20 is capable of greater rotation before reaching its break point.

| Degrees of Rotation | Length of Shaft 32 | | |
|---|---|---|---|
| | 1.5 Inch | 2 Inch | 3 Inch |
| | Applied Torque (Ft-lbs) | | |
| 5 | 625.0 | 583.3 | 483.3 |
| 10 | 733.3 | 691.7 | 650.0 |
| 15 | 800.0 | 754.2 | 708.3 |
| 20 | 854.2 | 800.0 | 750.0 |
| 25 | 891.7 | 841.7 | 783.3 |
| 30 | 929.2 | 875.0 | 808.3 |
| 35 | 958.3 | 900.0 | 833.3 |
| 40 | 975.0 | 925.0 | 858.3 |
| 45 | 991.7(F) | 950.0 | 875.0 |
| 50 | | 966.7 | 895.8 |
| 55 | | 983.3 | 916.7 |
| 59 | | 991.7(F) | |
| 60 | | | 925.0 |
| 65 | | | 941.7 |
| 70 | | | 958.3 |
| 75 | | | 966.7 |
| 80 | | | 979.2 |
| 85 | | | 987.5(F) |

(F) indicates shaft failure such as cracking or breaking.

In the disclosed seat arrangement 10, spool assemblies 20 are utilized as pivot points for rear legs 14 of seat 12 to which they are attached. When spools 20 operate in this manner, the direction of applied loads is immaterial because spools 20 translate those loads to rotational movement. Spools 20 thus serve to absorb rotational energy. By proper sizing and selection of materials, it is possible to limit the input loads to the seat occupant throughout the allowable movement response of seat 10.

The spool 20 should be designed to yield at a load which is lower than the load required to cause injury to the seat occupant. In addition, the break point should be designed so as to allow spool 20 to rotate throughout the movement of seat 10 without failing. For example, if spool 20 must rotate 45° to allow the seat to respond totally to an impact, its break point must be designed at some point beyond 45° to guard against premature breakage.

When properly integrated into seat arrangement 10, spool assembly 20 will yield in the plastic deformation stage of the material and absorb the kinetic energy of impact at a substantially constant rate throughout its deformation. Thus, in the case of a crash, the seat occupant will experience an increasing load up to the designed yield value, Y, of spool 20, and thereafter, a slightly progressive, subcritical load.

Although this device is capable of controlling load response in a predictable manner, it would be more advantageous to use a spool 20 which allows for a smooth transition to the high energy level of the plastic region of FIG. 6. Although the response of spool 20 is primarily in this area, its initial onset rate response is steep as evidenced by the slope of the curve in the elastic region. By eliminating this initial impact shock, spool 20 would provide for a more physiologically tolerable load response.

Figure 7:
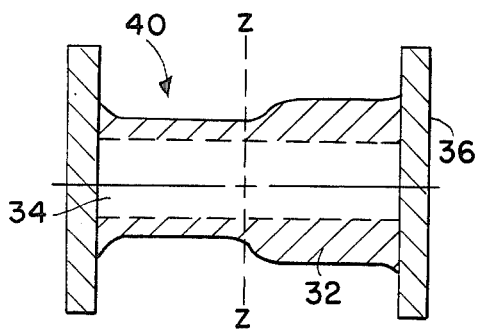
FIG. 7 is a side view of an alternate embodiment of the spool assembly of FIG. 3 wherein the wall thickness is stepped.
Figure 8:
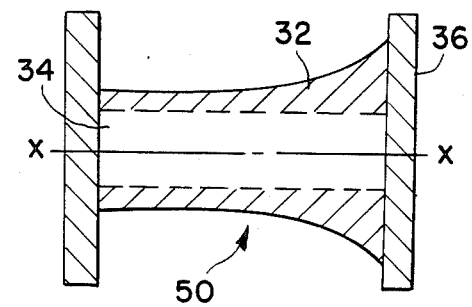
FIG. 8 is a side view of an alternate embodiment of the spool assembly of FIG. 3 wherein the walls are tapered.

FIGS. 7 and 8 present alternate embodiments of spool assemblies which achieve these results. Spool 40 shown in FIG. 7 comprises a tubular shaft 32 having walls which are stepped such that each section of shaft 32 has walls which are thicker than those of the section preceding it. Although spool 40 pictured utilizes only two sections, many may be employed as dictated by the desired load response.

In operation, the section to the left of line Z—Z will yield first when spool 40 is subjected to a transverse force; the section to its right remaining intact. Because the purpose of this design is to minimize the elastic response of spool 40, the walls of this section should be sufficiently thin to allow spool 40 to deform plastically at very low loads. Therefore, the yield value of this section, $Y_1$, should be relatively low compared to the yield value of the section to the right of line Z—Z, $Y_2$. Once the load has reached the level of $Y_2$, the next section will begin to deform plastically, further absorbing the energy of the applied loads. In this way a designer may tailor the response of spool 40 so as to allow for a smooth, progressive absorption of energy throughout the range of experienced loads.

Spool 50 as shown in FIG. 8 comprises a tubular shaft 32 having walls which increase smoothly in thickness from one end to another. Although the walls are tapered in this manner, the interivor cavity 34 of shaft 32 maintains a uniform diameter throughout.

In operation, spool 50 will absorb energy at a substantially constant rate throughtout its rotational deformation. As with spool 40 in FIG. 7, the walls toward the left end of line X—X should have a sufficiently low yield value so as to minimize the elastic response of spool 50.

Proceeding along line X—X, one observes an increasing rotational resistance characterized by gradually increasing yield values. Therefore, although yielding to relatively low input loads, spool 50 is capable of maintaining its energy absorption for increasingly higher loads up to the break point associated with the walls at the right end of line X—X.

Figure 9:
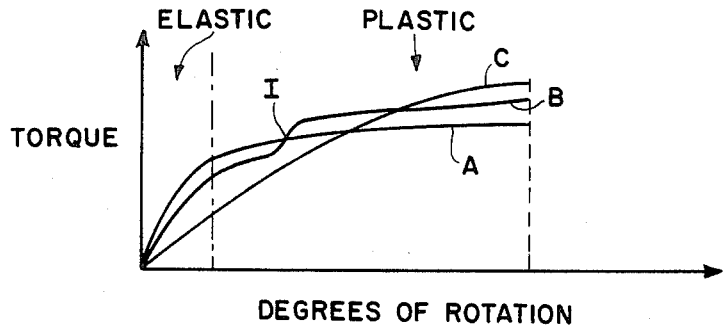
FIG. 9 is a graphical comparison of the general load response of several spool assemblies.

FIG. 9 is a graph comparing the general load response of several variations of the disclosed spool 20. Curve A illustrates the load response of a straight spool assembly 20 as shown in FIGS. 3 and 4. Curve B is the load response curve for spool 40 of FIG. 7. The point of inflection at I corresponds to that point where the load experienced by spool 40 exceeds the yield value of the thicker section, $Y_2$. The stepped response indicated on the graph signifies the increased energy absorption of spool 40. Finally, curve C illustrates the load response of tapered spool 50 of FIG. 9. Because of the design of spool 20, the elastic region of this curve is small, allowing for a progressive absorption of energy throughout the deformation of spool 50.

The advantages of this invention are numerous and it is particularly adapted for use as a load limiting member in a structure to control its response to applied loads.

Another advantage of this invention lies in its ability to deform plastically at a prescribed load, thereby absorbing the kinetic energy of impact at a substantially constant rate throughout its deformation.

Still another advantage of this invention is its ability to be designed according to the desired load response.

Further advantages of this invention include its light weight, its adaptability to present and anticipated vehicle construction techniques, its ease of manufacture and its low cost.

Although the use of torque rods and tubes as springs is well known in the art, the use of a spool assembly as in the present invention as a load limiting device is a new concept. The rod or tube of the prior art is utilized only as a coupling device and not as an energy absorber. By responding elastically to applied loads, the rod transfers energy only and does not operate as an energy dissipating, load limiting member.

The specifications herein discussed are not meant as limitations on the scope of the invention and its underlying theory as described in connection with the disclosed embodiment. Various changes may be made without departing from the spirit of the invention. For example, the spool assembly load limiting devices of the present invention may be modified for use in aircraft landing gear or automobile bumper systems. These and other modifications and variations of the present invention will be readily apparent to those skilled in the art in light of the above teachings.

What is claimed as new and desired to be secured by Letters Patent of the United States is:

1. A spool assembly adapted for use as a load limiting member in a structure to control the level of applied loads, comprising:
   a tubular shaft for absorbing rotational energy;
   said tubular shaft having an interior cavity of sufficiently large diameter and walls thereof sufficiently thin to cause it to deform plastically at a prescribed load;
   said tubular shaft having integrally formed flanged connecting ends, each said flanged end being circular and having a plurality of through holes arranged concentrically with said spool assembly, one of said flanged ends being connected rigidly to a structure and the other said flanged end being connected to pivotal structure causing rotation thereof under the influence of applied loads so as to cause said tubular shaft to twist when subjected to a transverse force; and
   said tubular shaft and said flanged connection ends being of unitary construction and having dimensions dictated by the desired load response, thereby causing all of said shaft to be utilized in dissipating energy.

2. A device as in claim 1 wherein the walls of said tubular shaft are tapered such that said walls progressively increase in thickness from one end to another, thereby allowing for a variable, progressive response to applied loads.

3. A device as in claim 1 wherein the walls of said tubular shaft are stepped such that each section of said walls is thicker than the preceding section, thereby ensuring a variable, progressive load response.

4. A load limiting seat serving to dissipate energy impulses transmitted to the seat occupant comprising:
   a seat structure;
   supporting means for securing said seat structure within a vehicle, said supporting means comprising a pair of front legs and a pair of rear legs connected to said vehicle in a pivotal manner;
   energy absorbing means for dissipating impact loads, said energy absorbing means being disposed along a horizontal axis adjacent the width of said seat structure; and
   said energy absorbing means comprising a pair of tubular spool assemblies rigidly connected in tandem at one end thereof to said seat structure and connected at the other ends thereof to individual rear legs of said supporting means and operating as pivot points for said supporting means, thereby twisting upon application of a force sufficient to cause said seat structure to move relative to said vehicle.

5. A seat as in claim 4 wherein said pair of spool assemblies has a single loose fitting rigid axle running through their interior cavities, thereby maintaining the rotational integrity of said spool assemblies and preventing transverse breakage.

6. A seat as in claim 4 wherein said front legs include deformable shock absorbing means which assist in absorption of energy upon application of a downward force on said seat structure.

7. A seat as in claim 4 wherein:
   said front legs are pivotally connected to both said vehicle and said seat structure;
   said rear legs are pivotally connected to said vehicle and rigidly connected to said tubular spool assemblies;

said tubular spool assemblies having flanged ends and an interior cavity of sufficiently large diameter and walls thereof sufficiently thin to cause it to deform plastically at a prescribed load; and said tubular spool assemblies having a loose fitting, rigid axle running through the interior cavities thereof and one end of each said spool being rigidly connected to common structure depending from essentially the mid-width of said seat and the other end of each said spool being connected to one of said rear support legs.

* * * * *